US009003125B2

(12) United States Patent
Ambroladze et al.

(10) Patent No.: US 9,003,125 B2
(45) Date of Patent: Apr. 7, 2015

(54) CACHE COHERENCY PROTOCOL FOR ALLOWING PARALLEL DATA FETCHES AND EVICTION TO THE SAME ADDRESSABLE INDEX

(75) Inventors: Ekaterina M. Ambroladze, Wappingers Falls, NY (US); Michael Blake, Wappingers Falls, NY (US); Tim Bronson, Round Rock, TX (US); Garrett Drapala, Poughkeepsie, NY (US); Pak-kin Mak, Poughkeepsie, NY (US); Arthur J. O'Neill, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 13/523,535

(22) Filed: Jun. 14, 2012

(65) Prior Publication Data
US 2013/0339622 A1 Dec. 19, 2013

(51) Int. Cl.
*G06F 12/08* (2006.01)
(52) U.S. Cl.
CPC ........ *G06F 12/0891* (2013.01); *G06F 12/0815* (2013.01); *G06F 12/0859* (2013.01)
(58) Field of Classification Search
CPC .............................. G06F 12/08; G06F 12/0815
USPC .......................... 711/133–134, 136, 141, 122
See application file for complete search history.

(56) References Cited

U.S. PATENT DOCUMENTS

| | | | | |
|---|---|---|---|---|
| 4,513,367 A | * | 4/1985 | Chan et al. | 711/145 |
| 5,530,958 A | * | 6/1996 | Agarwal et al. | 711/3 |
| 6,425,058 B1 | * | 7/2002 | Arimilli et al. | 711/134 |
| 8,392,658 B2 | * | 3/2013 | Wang et al. | 711/128 |
| 8,495,301 B1 | * | 7/2013 | Alexander et al. | 711/118 |
| 8,593,918 B1 | * | 11/2013 | Lecrone et al. | 369/30.01 |
| 2004/0117592 A1 | * | 6/2004 | Day et al. | 711/207 |
| 2006/0179227 A1 | * | 8/2006 | Hrusecky et al. | 711/128 |
| 2006/0236074 A1 | * | 10/2006 | Williamson et al. | 711/216 |
| 2007/0204121 A1 | * | 8/2007 | O'Connor et al. | 711/163 |
| 2009/0182952 A1 | * | 7/2009 | Moyer | 711/136 |

(Continued)

OTHER PUBLICATIONS

Wang, Zhenlin; McKinley, Kathryn S.; Rosenberg, Arnold L.; Weems, Charles C.. Using the Compiler to Improve Cache Replacement Decisions. 2002. IEEE Computer Society. Proceedings of the 2002 International Conference on Parallel Architectures and Compilation Techniques (PACT'02).*

Archibald, James; Baer, Jean-Loup. Cache Coherence Protocols: Evaluation Using a Multiprocessor Simulation Model. Nov. 1986. ACM Transactions on Computer Systems, vol. 4, No. 4, pp. 273-298.*

(Continued)

*Primary Examiner* — Mohammad Islam
*Assistant Examiner* — Mikka Liu
(74) *Attorney, Agent, or Firm* — Cantor Colburn LLP; Margaret McNamara (57) ABSTRACT

A technique for cache coherency is provided. A cache controller selects a first set from multiple sets in a congruence class based on a cache miss for a first transaction, and places a lock on the entire congruence class in which the lock prevents other transactions from accessing the congruence class. The cache controller designates in a cache directory the first set with a marked bit indicating that the first transaction is working on the first set, and the marked bit for the first set prevents the other transactions from accessing the first set within the congruence class. The cache controller removes the lock on the congruence class based on the marked bit being designated for the first set, and resets the marked bit for the first set to an unmarked bit based on the first transaction completing work on the first set in the congruence class.

11 Claims, 6 Drawing Sheets

(56) References Cited

U.S. PATENT DOCUMENTS

| | | | |
|---|---|---|---|
| 2011/0167224 A1* | 7/2011 | Isono | 711/122 |
| 2011/0179227 A1* | 7/2011 | Okabayashi et al. | 711/133 |
| 2011/0320720 A1* | 12/2011 | Walters et al. | 711/122 |
| 2011/0320863 A1* | 12/2011 | Amroladze et al. | 714/6.1 |
| 2012/0323872 A1* | 12/2012 | Vasquez Lopez et al. | 707/704 |

OTHER PUBLICATIONS

Tyson et al. "Managing data caches using selective cache line replacement." 1997. International Journal of Parallel Programming, vol. 25, No. 3. pp. 213-242.*

* cited by examiner

Select a first set out of a plurality of sets in a congruence class based on a cache miss for a first transaction 405

↓

Place a lock on the congruence class in an entirety in which the lock prevents other transactions from accessing the congruence class 410

↓

Designate in a cache directory the first set with a marked bit indicating that the first transaction is working on the first set, the marked bit corresponding to the first set prevents the other transactions from accessing the first set within the congruence class 415

↓

Remove the lock in its entirety on the congruence class based on the marked bit being designated for the first set 420

↓

Resetting the marked bit for the first set to an unmarked bit based on the first transaction completing work on the first set in the congruence class 425

CACHE COHERENCY PROTOCOL FOR ALLOWING PARALLEL DATA FETCHES AND EVICTION TO THE SAME ADDRESSABLE INDEX

BACKGROUND

An embodiment relates generally to cache coherency, and more specifically, to a cache coherency protocol for allowing parallel data fetches and evictions to the same addressable index.

A cache is a component that transparently retains data elements (or simply data) so that future requests for any retained data can be served faster. A data element that is stored within a cache corresponds to a pre-defined storage location within a computer system. Such data element might be a value that has recently been computed or a duplicate copy of the same storage location that are also stored elsewhere. If requested data is contained in the cache, this is a cache hit, and this request can be served by simply reading the cache, which is comparatively faster since the cache is usually built close to its requester. Otherwise, if the data is not contained in the cache, this is a cache miss, and the data has to be fetched from a storage system medium not necessarily close to the requester, and thus is comparatively slower. In general, the greater the number of requests that can be served from the cache, the faster the overall system performance becomes.

In computing, cache coherence (also cache coherency) refers to the consistency of data stored in local caches of a shared resource. When clients in a system maintain caches of a common memory resource, issues may arise with inconsistent data. This is particularly true of central processing units (CPUs) in a multiprocessing system. If one client has a copy of a memory block from a previous read and a second client changes that memory block, the first client could be left with an invalid cache of memory without any notification of the change. Cache coherency is intended to manage such conflicts and maintain consistency between the cache and system memory.

SUMMARY

Embodiments include a system, and computer program product for enabling concurrent cache line replacement operations to a multiple cache line sets of a congruence class. A cache controller marks one or more sets of the congruence class with marked bits to indicate that the marked sets are unavailable while performing replacement operations on the marked sets. The sets are respectively unmarked based on the replacement operations being complete for the sets. The cache controller selects unmarked sets of the congruence class without the marked bits to permit new replacement operations to be performed on the unmarked sets.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

In an embodiment, a cache controller has logical circuits configured to implement a coherency protocol that reduces the amount of time that a congruence class is blocked for cache misses. The coherency protocol provides parallel (e.g., at and/or nearly at the same time) data fetches and evictions to the same congruence class by marking the particular sets being worked on so that the sets not being worked on are available for access.

In state of the art cache designs, only 1 (one) cache miss is allowed for each addressable index (i.e., addressable index is used interchangeably with congruence class). A CPU (central processing unit) fetch that misses in the cache will have to cast out a valid set in the congruence class (i.e., addressable index) and bring in (i.e., store) the missed cache line from system memory to store the data in that set. At the time of the cache miss, the cache coherency logic picks a set to perform the operation. In cache systems, everything is protected by the address. Between the time the system invalidates the old address and the new cache line is brought in (stored in the particular set), the set does not contain a valid address to protect the set from another fetch miss (needing to use that set). During this time, the cache system does not know if any of the sets in the congruence class (index) are being used for any fetch miss.

State of the art cache systems do not provide ways to increase the number of cache misses that can be done in the same congruence class (same addressable index). Instead, state of the art cache systems block the entire congruence class from access.

Embodiments allows the cache to process many outstanding fetch misses at the same time for the different sets in the congruence class (i.e., in the addressable index). This technique is implemented with little extra logic to make sure that there are no conflicts between fetch misses. Embodiments indicate (e.g., with a marked bit) to the cache system that the set is being used at the time the set is selected for a fetch miss. This may be accomplished by setting 1 bit in the tag which lets the cache system (e.g., cache controller) know that the set is now used for a cache miss and is not protected by a valid address. This bit is reset when the new data is installed in the cache and validated via the tag, and the set is now protected by a valid full address. During the time the bit is on (i.e. the marked bit is set), for any future fetch miss, the cache logic that picks which set to put the new data in will ignore any sets that have their respective marked bits on; this allows the fetch miss to pick a different set that is not being used (i.e., without a marked bit) for prior fetch misses. The cache logic (in the cache controller) resets the marked bit once a valid line is installed because there is no need to protect that set anymore.

In the present disclosure, this technique allows the cache to increase performance of cache access because the cache controller allows multiple data fetches in parallel to the same address addressable index (i.e., the same congruence class) at very low hardware cost. With this approach, the addressable index is only blocked for a short amount of time to allow the cache controller (e.g., state machine) to mark the set as being used.

Figure 1:
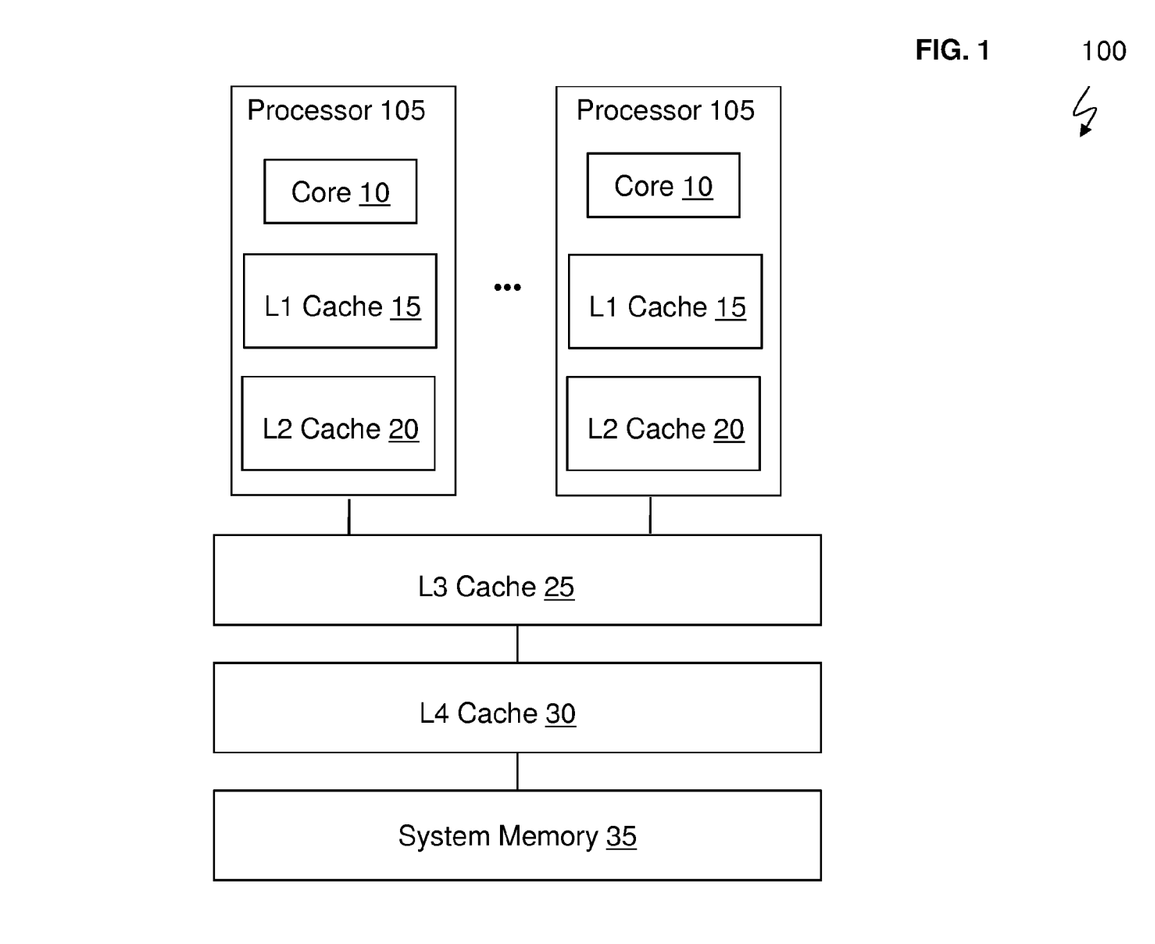
FIG. 1 depicts a block diagram of system in accordance with an embodiment.

Turning now to FIG. 1, a block diagram of a system 100 is generally shown according to an embodiment. The system 100 includes one or more processors 105 (processing circuits). The processors 105 may each have one or more processor cores 10 (e.g., single core, dual core, quad core, etc.), and the processor cores 10 may be referred to as circuitry.

The processors 105 may each include (on chip) a level one (L1) cache 15 and a level two (L2) cache 20. The L1 cache 15 and L2 cache 20 may be on-processor (hardware) memory for caching (i.e., retaining) data on the processor 105. The processors 105 may be operatively connected to a level three (L3) cache 25 and a level four (L4) cache 30.

Data retrieved from system memory 35 may be cached in any of the caches (e.g., in the L1 cache 15, L2 cache 20, L3 cache 25, and/or L4 cache 30). Typically, the cache size (in the cache hierarchy) increases as the cache level increases. L1 cache 15 is the smallest size cache and the closest to the processor core 10. The L4 cache 30 is the largest size cache and furthest away from the processor core 10 but system memory 35 is even larger. All the caches can be inclusive caches, which contain all the data that resides in the lower caches, or victim caches, which contain only data that is sent up from lower caches.

Figure 2:
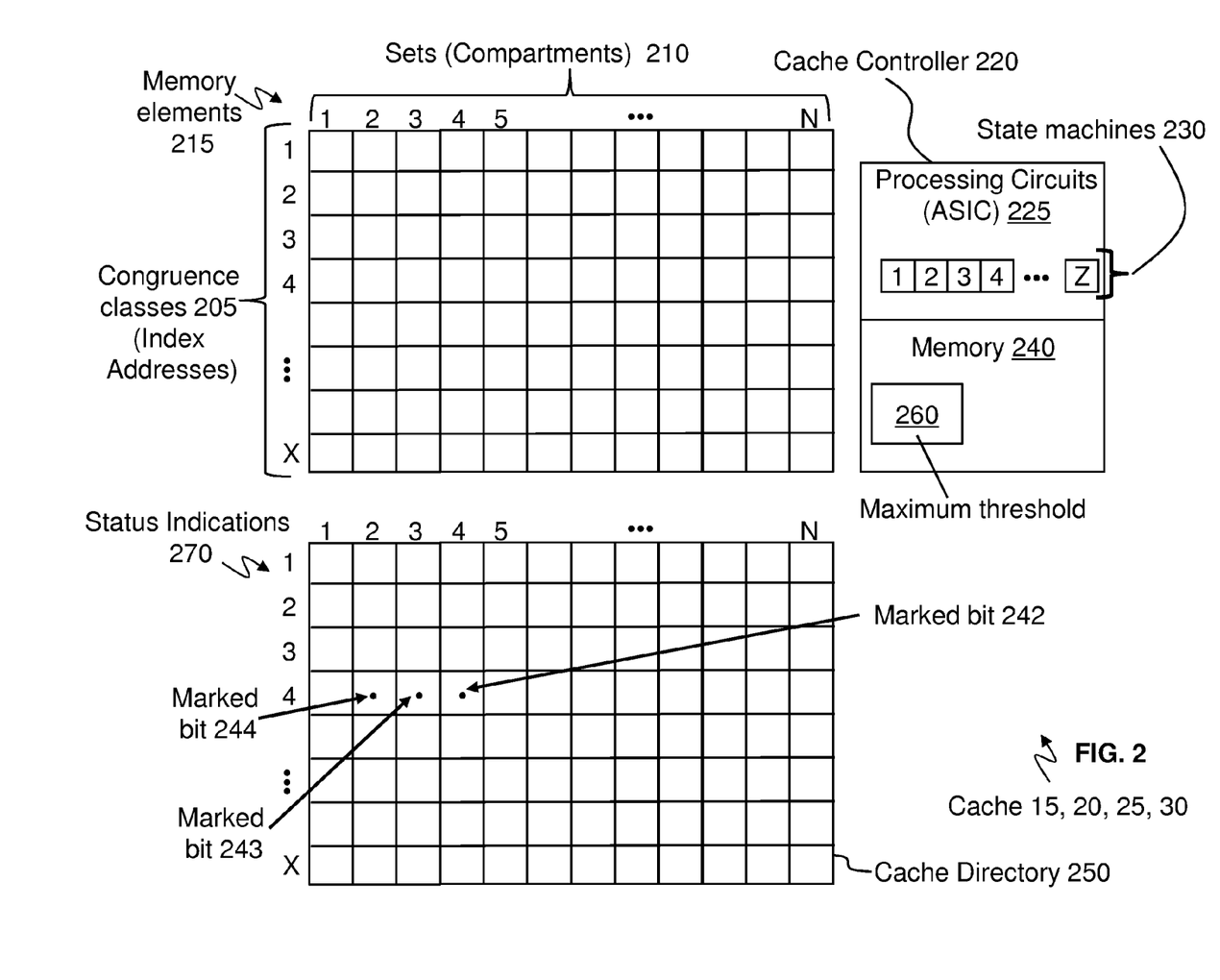
FIG. 2 depicts details of a cache performing a cache coherency protocol in accordance with an embodiment.

FIG. 2 illustrates further details of the caches which can apply to the L1 cache 15, L2 cache 20, L3 cache 25, and/or L4 cache 30 according to the embodiment. In one case, the details may apply to the L3 cache 25 and L4 cache 20 because of their larger size.

For ease of explanation and not limitation, reference is made to the L3 cache 25 when discussing FIG. 2 and it is contemplated that the various explanations apply to all caches including L1 cache 15, L2 cache 20, L3 cache 25, and L4 cache 30.

In FIG. 2, the L3 cache 25 (along with 15, 20, 30) may be an N-way set associative cache, with 1-X congruence classes 205 (shown as rows) and 1-N sets (shown as columns) as understood by one skilled in the art. As discussed herein, each congruence class 205 can also be referred to as an addressable index, and each set 210 can be referred to as a compartment.

In the example shown in FIG. 2, this is a 12-way set associative cache for the L3 cache 25. There could be fewer or more sets 210 in the cache as desired, and 12 sets are used for explanation purposes.

The L3 cache 25 has numerous memory elements 215 each of which stores data. The memory elements 215 also referred to as memory cells are integrated circuits for storing data as understood by one skilled in the art. The L3 cache 25 also includes a cache controller 220 that controls loading (writing), evicting, and reading (requesting) data in the memory elements 215 of the L3 cache 25. The L3 cache 25 includes a cache directory 250. The cache directly 250 has a grid of status indications 270, where each individual status indication 270 directly represents a corresponding memory element 215 in the cache (e.g., L3 cache 25). Each set (compartment) 210 has its own corresponding address and bits that indicate the status, valid or invalid, empty, owned, offline, marked, etc. The cache controller 220 controls, makes updates, and manages the cache directory 250 as well as the memory elements 215.

The cache controller 220 may include processing circuits 225 which may be application specific integrated circuits (ASIC) and various state machines 230. The state machines (e.g., finite-state machine (FSM) or finite-state automaton) can read a series of inputs. When the state machine reads an input it will switch to a different state. Each state specifies which state to switch to for a given input.

For example, the state machine is a mathematical model used to design computer programs and digital logic circuits. The state machine can be in one of a finite number of states. The state machine is in only one state at a time, and the state it is in at any given time is called the current state. The state can change from one state to another when initiated by a triggering event or condition, and this is called a transition. Each particular state machine 230 is defined by a list of the possible transition states from each current state and by the triggering condition for each transition. The state machines 230 have different roles that they are designed to fulfill. The state machines 230 may be used by a transaction or operation to access data stored in the memory elements 215. The state machines 230 (in the cache controller 220) can access the memory elements 215 (i.e., access the cache) for any of the processors 105 (e.g., any of the respective processor cores 10, any application in the system memory 35, etc.).

A fetch miss operation/procedure is discussed below. A fetch miss operation is defined by a request for data coming from any of the processors 105 (e.g., any of the respective processor cores 10, any application in the system memory 35, etc.). Once a cache controller 220 receives the request, the cache controller 220 loads a state machine 230 to look up if the L3 cache 25 (for example) contains the requested data. The state machine 230 will access the cache directory 250 for a specific congruence class 205, and compares the requesting address against all the sets 210 in that congruence class 205. If the addresses match and the status indication 270 has a valid bit on (e.g., the valid bit that has a 1 (one for turned on)), then the state machine 230 returns the data to the requestor. If none of the valid addresses match the requesting address, then the state machine 230 will pick a set 210 in the same congruence class 205 (assume set 4 in congruence class 4) which is not being used for another fetch miss. If set 4 is empty, the cache controller 220 is allowed to install fetched data anytime. If set 4 has a valid address and data in it, the cache controller 220 can either cast out the data from this set 4 to a higher level cache or system memory 35 if the data has been changed in relationship to what is contained in the higher level cache or system memory 35, or can invalidate set 4 by updating the status indicator's 270 valid bit to off position (e.g., the valid bit that has a 0 (turned off)) if the data has not been changed in relationship to what is contained in a higher level cache or system memory 35. Usually, sets are picked based on the least recently used sets, a round robin system, or particularly designated sets. The state machine 230 will also send out a request (from a higher cache level or system memory 35) to send the data to the L3 cache 25. Once the cast out of the old data is completed and the newly requested data has arrived, the cache controller 220 installs the new data into the memory element 215 which corresponds to congruence class 4 and set 4 and updates the status indication 270 in cache directory 250 for congruence class 4 and set 4 with the requested address, valid and ownership bits. In state of the art, from the time that the state machine 230 is loaded with the newly requested address to the time that the controller has installed the new data and updated the status indication 270, that congruence class 4 is protected by the state machine 230 and no other requests will be allowed to access the congruence class to look up if their requests are cache misses or cache hits.

Figure 3:
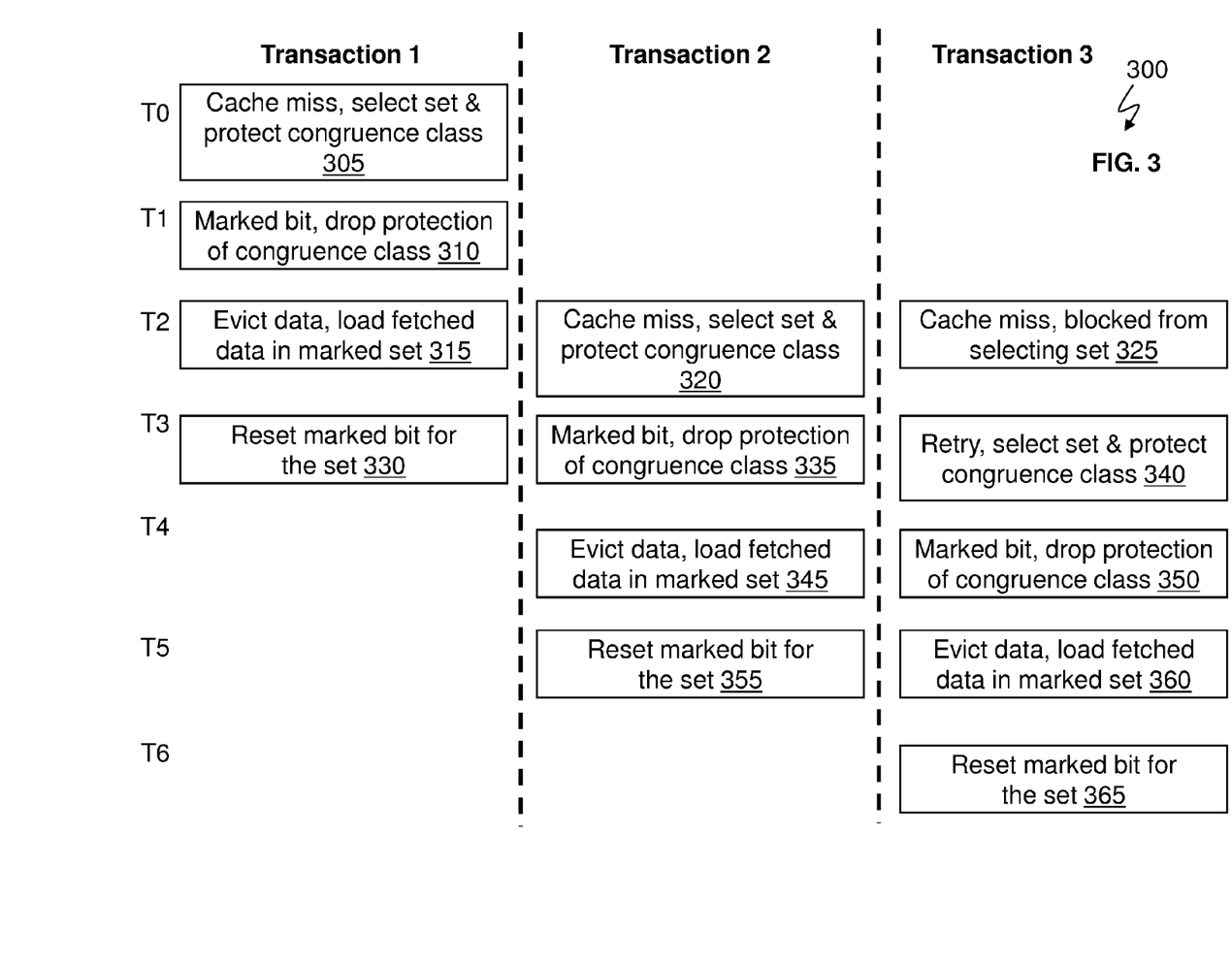
FIG. 3 depicts a flow diagram of performing parallel data fetches and evictions to the same congruence class in accordance with an embodiment.

FIG. 3 is a flow diagram 300 of processes (performed by the cache controller 220) allowing parallel data fetches and evictions to the same congruence class 205 (i.e., the same addressable index) according to an embodiment. Reference can be made to FIGS. 1 and 2.

This example scenario shows three transactions (transaction 1, transaction 2, and transaction 3 executed by the cache controller 220) that operate in parallel on the same congruence class 205 (such as, e.g., the congruence class 4) but applies to each of the congruence classes 205. A transaction (i.e., operation) may be requested by and on behalf of any processor 105, any processor core 10, any application stored in system memory 35, etc. For explanation purposes and ease of understanding, congruence class 4 is utilized in this scenario.

At time T0 for transaction 1, there is a cache miss in the congruence class 4, the cache controller 220 picks a set 210 (such as the set 4) in the congruence class 4 which is not being used by another transaction, state machine 230 is loaded with the fetch miss operation and with the newly identified set 4, and the same state machine 230 protects the whole congruence class 4 (i.e., addressable index 4) from access by other transactions at block 305. The whole congruence class 4 is locked from access by other transactions which includes blocking cache hits, blocking cache misses, no loading data from the system memory 35 into (sets in) the congruence class 4, no evicting data from (any sets in) the congruence class 4, etc.

At time T1 for transaction 1, the state machine 230 marks a marked bit 242 (i.e., tag) exclusively for the set 4 in the cache directory 250 to indicate that transaction 1 is working on the set 4, and the state machine drops/releases the protection on the whole congruence class 4 (addressable index) at block 310. The marked bit 242 is designed to only block access to the set 4 from other transactions while allowing access to the congruence class 4 as a whole and any other sets in the congruence class that do not have their respective marked bits on/set.

At time T2 for transaction 1, the state machine 230 works on casting out (evicting) the current data in the set 4 and bringing in (retrieving data from higher level caches or system memory 35 to load the retrieved data into the set 4) data into the set 4 of the congruence class 4 at block 315.

At time T2 for transaction 2, there is a cache miss in the congruence class 4, the cache controller 220 picks a set 210 (such as the set 3) in the congruence class 4 that is not being used by another transaction and that does not have a marked bit (i.e., marked tag), and cache controller locks/protects the whole congruence class 3 at block 320. The cache controller 220 did not pick the set 4 for transaction 2 because the cache controller 220 recognizes the marked bit 242 (indicating that the set 4 is in use) in the cache directory 250 corresponding to the set 4, although the congruence class 4 is not protected (locked) as a whole when the selection of set 3 is made by the cache controller. A state machine 230 is loaded with the fetch miss operation and with the newly identified set 3, while the cache controller 220 protects the whole congruence class 4 (i.e., addressable index 4) from requesting access by other new transactions (at time T2 for transaction 2). The whole congruence class 4 is again locked from access by new transactions which includes blocking cache hits, blocking cache misses, no loading data from higher cache levels or the system memory 35 into (sets in) the congruence class 4, no evicting data from (any sets in) the congruence class 4, etc. However, since transaction 1 has previously marked the marked bit 242 for set 4, the transaction 1 working on set 4 is not affected by the lock placed on the congruence class 4 by the transaction 2, and transaction 1 is permitted to continue working on the set 4 as long as the marked bit 242 is set. At time T2, transaction 1 does not see (recognize) the lock on the congruence class 4 because transaction 1 has ownership of the set 4.

At time T2 for transaction 3, there is a cache miss in the congruence class 4, and the cache controller 220 recognizes that the (whole) congruence class is locked/protected by transaction 2 at block 325. As such, transaction 3 can not evict data from any sets 210 in the congruence class 4 to then fetch and load the desired data from higher cache levels or the system memory 35 into a selected set because the entire congruence class 4 is locked. Transaction 3 has to wait until the protection for the congruence class is dropped before making further progress.

At time T3 for transaction 1, once the fetched data is brought in (i.e., loaded) to set 4 from the system memory 35 by the cache controller 220, the state machine 230 updates the marked bit 242 (tag) to be unmarked (i.e., off) and to indicate that the set 4 is a valid address, and the cache controller 220 resets the marked bit 242 such that the set 4 can be utilized by other transactions as needed at block 330. For example, if the marked bit 242 is represented by a value 1 (one), the unmarked bit (i.e., not set) is represented by a value 0 (zero).

At time T3 for transaction 2, the state machine 230 marks a marked bit 243 (i.e., tag) for the set 3 in the cache directory 250 to indicate that transaction 2 is presently working on the set 3, and the state machine 230 drops/releases the protection on the whole congruence class 4 (addressable index) at block 335.

At time T3 for transaction 3, the transaction 3 gets the indication that the protection for the congruence class 4 is dropped and (successfully) tries the fetch again for the congruence class 4, a state machine 230 is loaded with the fetch miss operation, and the cache controller 220 picks a set 210 (such as the set 2) in the congruence class 4 that is not being used by another transaction and that does not have a marked bit (i.e., marked tag), and the cache controller 220 now locks the whole congruence class 4 at block 340. The cache controller 220 does not pick the set 3 and/or set 4 (assuming set 4 is still in the process of being reset at time T4 but has not actually been reset/turned off) for transaction 3 because the cache controller 220 recognizes the marked bit 242 (indicating that the set 4 is in use) and marked bit 244 (indicating that set 3 is in use) are set in the cache directory 250, although the congruence class 4 is not protected (locked) as a whole. Set 2 has been identified by the cache controller 220 as being available to have its data evicted out, and this allows set 2 to be available for a data fetch for transaction 3. As can be seen, both sets 3 and 4 have been respectively marked with marked bits 243 and 242, and these sets are presently off limits to the cache controller 220 while the transaction 3 still accesses the congruence class 4. A state machine 230 is loaded with the fetch miss operation and with the newly identified set 2, while the cache controller 220 protects the whole congruence class 4 (i.e., addressable index 4) from access by other transactions (at time T3 for transaction 3). The whole congruence class 4 is locked from access by other transactions as discussed herein but not from any transactions with previously marked bits.

At time T4 for transaction 2, the state machine 230 works on casting out (evicting) the current data in the set 3 and bringing in (retrieving data from higher cache levels or system memory 35 to load the retrieved data into the set 3) data into the set 3 of the congruence class 4 at block 345.

At time T4 for the transaction 3, the state machine 230 marks the marked bit 244 (i.e., tag) for the set 2 in the cache directory 250 to indicate that transaction 3 is working on the set 2, and the state machine drops/releases the protection on the whole congruence class 4 (addressable index) at block 350.

At time T5 for transaction 2, once the fetched data is brought in (i.e., loaded) to set 3 from higher cache levels or the system memory 35 by the cache controller 220, the state machine 230 updates the marked bit 243 (tag) to be unmarked and to indicate that the set 3 is a valid address, and the cache controller 220 resets (unmarks) the marked bit 243 such that the set 3 can be utilized by other transactions as needed at block 355.

At time T5 for transaction 3, the state machine 230 works on casting out (evicting) the current data in the set 2 and bringing in (retrieving data from higher cache levels or system memory 35 to load the retrieved data into the set 2) data into the set 2 of the congruence class 4 at block 360.

At time T6 for transaction 3, once the fetched data is brought in (i.e., loaded) to set 2 from high cache level or the system memory 35 by the cache controller 220, the state machine 230 updates the marked bit 244 (tag) to be unmarked and to indicate that the set 2 is a valid address, and the cache controller 220 resets (unmarks) the marked bit 244 such that the set 2 can be utilized by other transactions as needed at block 365.

This process of locking the entire congruence class 4 (or any congruence class 205) and releasing the locked congruence class 4 once the marked bit is set/turned on for a particular set continues for other transactions in the congruence class 4 until N−1 sets (e.g., for 12 sets per congruence class, a maximum marks threshold 260 per congruence class is then 12−1=11) are marked as being in use at the same time. Additionally, multiple sets may be marked with marked bits (turned on) in multiple congruence classes 205, and each congruence class may have a maximum marks threshold 260 of N−1 that is checked by the cache controller 220.

When the maximum marks threshold 260 is met (e.g., 11 sets have marked bits) for a particular congruence class 205 (such as congruence class 4) and a new transaction requests (desires) to access a set in the congruence class 4 to evict data and then load fetched data, the cache controller 220 protects/locks the whole congruence class 4 because the maximum marks threshold 260 has been met. This protection/lock for the whole congruence class 4 is held (by the cache controller 220) until the operation is completed. The operation is completed when the newly requested data is brought in from the higher cache level or system memory 35, when the newly requested data is installed into the memory element 215, and when the valid address has been installed in the status indicator 270 (for the particular set in congruence class 4) in the cache directory 250. Once the number of marked sets having marked bits drops below the maximum marks threshold 260 (N−1) and the protection/lock for the whole congruence class 4 is removed, the new transaction is allowed to access and mark an available set as desired.

Figure 4:
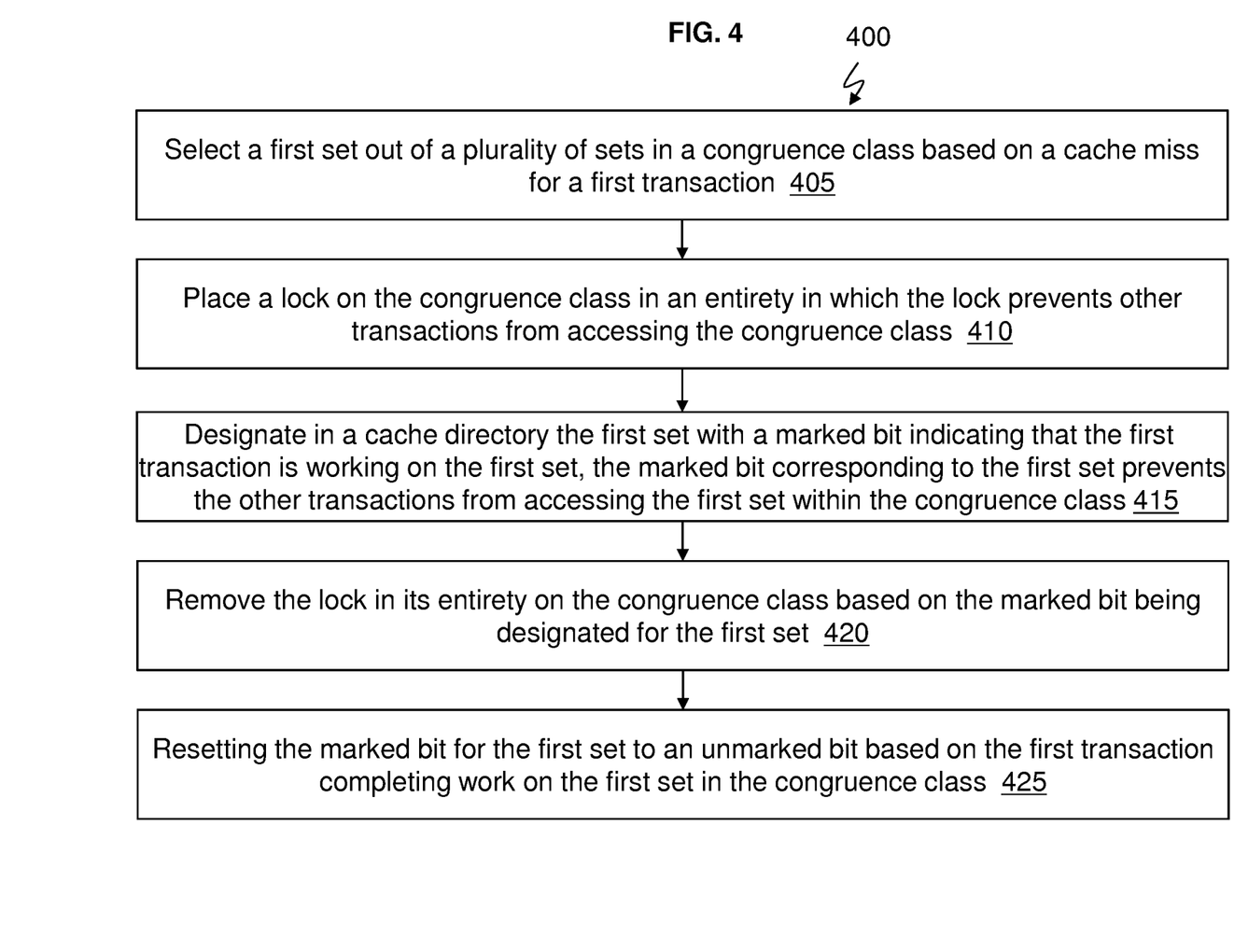
FIG. 4 depicts a flow chart of cache coherency in accordance with an embodiment.

FIG. 4 is a method 400 executed by the cache controller 220 for any of the caches such, e.g., L1 cache 15, L2 cache 20, L3 cache 25, and/or L4 cache 30 according to an embodiment. The method 400 is for performing parallel data fetches (e.g., because of a cache miss), loads, and evictions by turning on a marked bit to execute replacement operations. Once skilled in the art understands replacement operations for caches. Reference can be made to FIGS. 1-3.

At block 405, the cache controller 220 is configured to select a first set (e.g., set 4) out of a plurality of sets 210 in a congruence class (e.g., congruence class 4) based on a cache miss for a first transaction (e.g., transaction 1). The cache controller 220 is configured to place a lock on (i.e., protect) the congruence class 205 in its entirety in which the lock prevents other transactions (e.g., transactions 2, 3, 4, etc.) from accessing the congruence class 205 at block 410. Blocks 405 and 410 occur at the same time and are part of the replacement operation.

At block 415, the cache controller 220 is configured to designate in the cache directory 250 the first set with a marked bit (e.g., marked bit 242) indicating that the first transaction is working on the first set, and the marked bit corresponding to the first set prevents the other transactions from accessing the first set within the congruence class 205. At block 420, the cache controller 220 is configured to remove the lock in the entirety from the congruence class 205 (e.g., congruence class 4) based on the marked bit (e.g., marked bit 242) being designated for the first set. The cache controller 220 is configured to reset the marked bit for the first set to an unmarked bit based on the first transaction completing work on the first set in the congruence class at block 425.

Further, the cache controller 220 is configured to evict old data out of the first set (e.g., set 4) if needed (as discussed herein) and install new data (fetched from system memory 35) in the first set to complete work on the first set. This is a replacement operation.

The cache controller 220 is configured to select a second set (e.g., set 3) in the plurality of sets 210 for the congruence class (e.g., congruence class 4) based on a cache miss for a second transaction (e.g., transaction 2) (while transaction 1 works on the set 4 of the same congruence class 4). The cache controller 220 is configured to allow the second transaction to access the second set (e.g., set 3) in the plurality of sets 210 based on the lock on the congruence class (e.g., congruence class 4) in the entirety being removed for the first transaction, and to place the lock on the congruence class in the entirety based on the second transaction accessing the second set. The lock placed by the second transaction permits any ongoing work to the first set by the first transaction based on the marked bit (e.g., marked bit 242) being designated for the first set and prevents the other future (i.e., new) transactions (e.g., transaction 3, 4, etc.) from accessing the (same) congruence class.

The cache controller 220 is configured to designate in the cache directory 250 the second set with a marked bit (e.g., marked bit 244) indicating that the second transaction is working on the second set, and the marked bit corresponding to the second set prevents the other transactions from accessing the second set within the congruence class. Because of the marked bit (e.g., 243), the cache controller 220 is configured to remove the lock in the entirety on the congruence class placed by the second transaction based on the marked bit being designated for the second set.

The cache controller 220 is configured to allow the second transaction to work on the second set (e.g., set 3) as the first transaction works on the first set (e.g., set 4) both when their particular congruence class 205 (e.g., congruence class 4) is locked and unlocked to other transactions. Any transactions that have already started and have marked bits their respective sets are allowed to proceed in parallel.

The cache controller 220 is configured to allow N−1 sets (maximum marked bits threshold 260 per congruence class) of the plurality of sets in the congruence class to be respectively marked with the marked bit (such as marked bits 242, 243, 244 and others per congruence class 205), a N is a total number of sets (e.g., 12 sets) in the plurality of sets in the congruence class. The cache controller 220 is configured to lock the particular congruence class from further access by the other transactions based on the N−1 sets (e.g., 11 sets) in that particular congruence class (e.g., congruence class 4)

being respectively marked with the marked bit. Additionally and/or alternatively, the cache controller 220 is configured to block the other transactions from further marking any of the plurality of sets based on the N−1 sets in the congruence class (e.g., congruence class 4) being respectively marked with the marked bit. In one case, note that the maximum marked bits threshold 260 can be set to any number from 0 to N−1, but when the maximum marked bits threshold is set to 0, the marked bit feature (i.e., such as setting the marked bits 242, 243, 244, and other marked bits according to the discussions herein) is effectively disabled.

Figure 5:
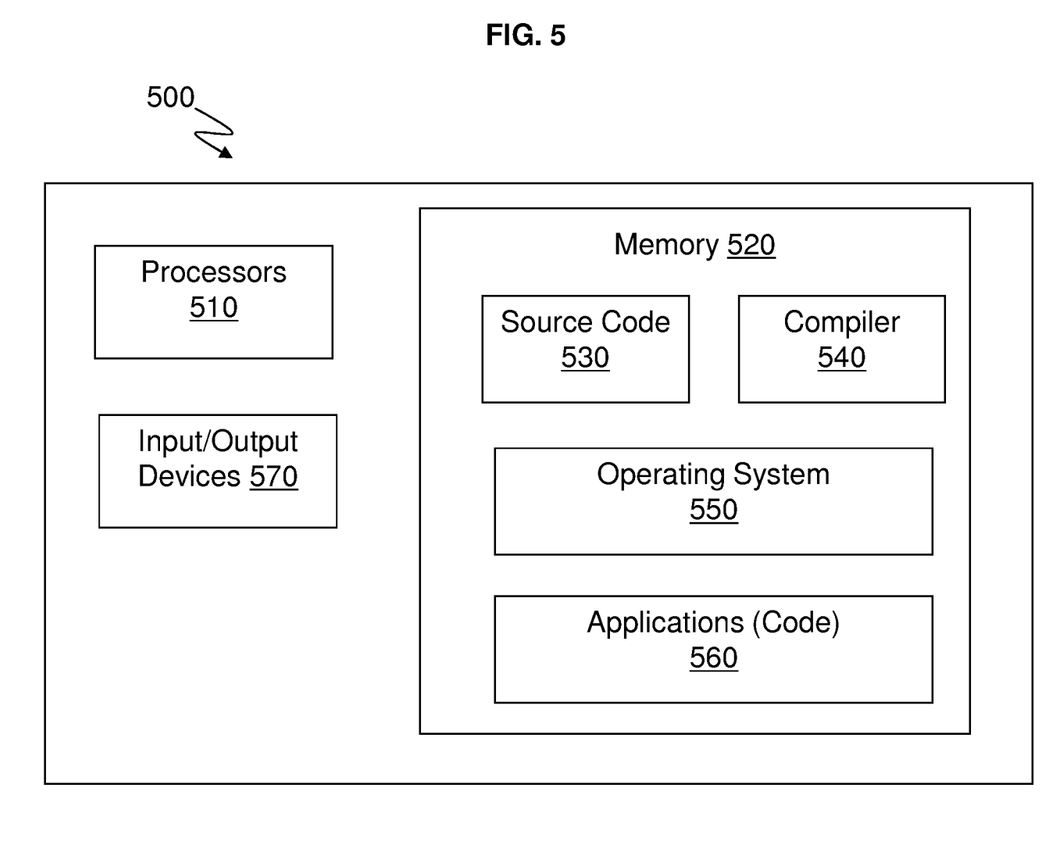
FIG. 5 illustrates an example of a computer having capabilities, which may be included and utilized in embodiments.

FIG. 5 illustrates an example of a computer 500 (computer system) having capabilities, which may be included and utilized in exemplary embodiments. Various methods, procedures, modules, flow diagrams, tools, applications, circuits, elements, and techniques discussed herein may also incorporate and/or utilize the capabilities of the computer 500. Moreover, capabilities of the computer 500 may be utilized to implement features of exemplary embodiments discussed herein. One or more of the capabilities of the computer 500 may be utilized to implement, incorporate, to connect to, and/or to support any element discussed herein (as understood by one skilled in the art) in FIGS. 1-4 and 6.

Generally, in terms of hardware architecture, the computer 500 may include one or more processors 510, computer readable storage memory 520, and one or more input and/or output (I/O) devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a data signal processor (DSP), or an auxiliary processor among several processors associated with the computer 500, and the processor 510 may be a semiconductor based microprocessor (in the form of a microchip) or a microprocessor.

The software in the computer readable memory 520 may include one or more separate programs, each of which comprises an ordered listing of executable instructions for implementing logical functions. The software in the memory 520 includes a suitable operating system (O/S) 550, compiler 540, source code 530, and one or more applications 560 of the exemplary embodiments. As illustrated, the application 560 comprises numerous functional components for implementing the features, processes, methods, functions, and operations of the exemplary embodiments. The application 560 of the computer 500 may represent numerous applications, agents, software components, modules, interfaces, controllers, etc., as discussed herein but the application 560 is not meant to be a limitation.

The operating system 550 may control the execution of other computer programs, and provides scheduling, input-output control, file and data management, memory management, and communication control and related services.

The application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. Furthermore, the application 560 can be written as (a) an object oriented programming language, which has classes of data and methods, or (b) a procedure programming language, which has routines, subroutines, and/or functions.

The I/O devices 570 may include input devices (or peripherals) such as, for example but not limited to, a mouse, keyboard, scanner, microphone, camera, etc. Furthermore, the I/O devices 570 may also include output devices (or peripherals), for example but not limited to, a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or an intranet. The I/O devices 570 may be connected to and/or communicate with the processor 510 utilizing Bluetooth connections and cables (via, e.g., Universal Serial Bus (USB) ports, serial ports, parallel ports, FireWire, HDMI (High-Definition Multimedia Interface), etc.).

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software it should be noted that the application 560 can be stored on virtually any computer readable storage medium for use by or in connection with any computer related system or method.

The application 560 can be embodied in any computer-readable medium 520 for use by or in connection with an instruction execution system, apparatus, server, or device, such as a computer-based system, processor-containing system, or other system that can fetch the instructions from the instruction execution system, apparatus, or device and execute the instructions In exemplary embodiments, where the application 560 is implemented in hardware, the application 560 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 500 includes non-limiting examples of software and hardware components that may be included in various devices, servers, and systems discussed herein, and it is understood that additional software and hardware components may be included in the various devices and systems discussed in exemplary embodiments.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 6:
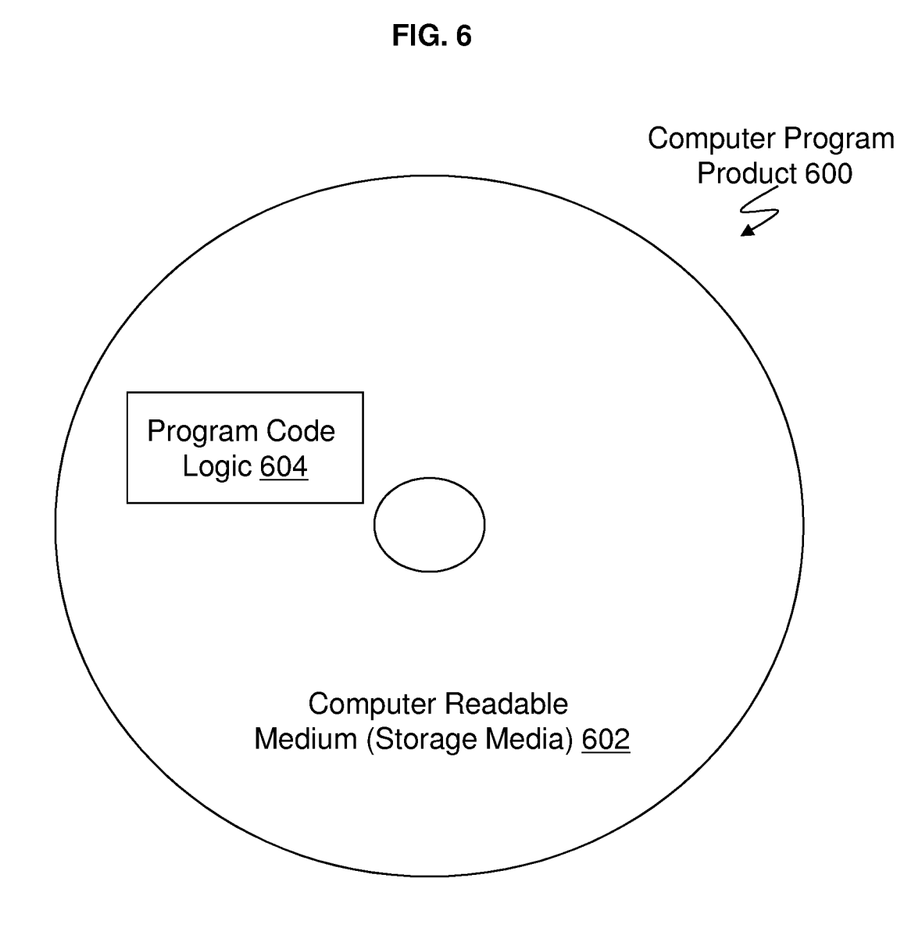
FIG. 6 illustrates a computer program product in accordance with an embodiment.

Referring now to FIG. 6, in one example, a computer program product 600 includes, for instance, one or more storage media 602, wherein the media may be tangible and/or non-transitory, to store computer readable program code means or logic 604 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

Technical effects and benefits include a cache controller that increases performance of cache access because the cache controller allows multiple data fetches in parallel to the same addressable index/congruence class at a very low hardware cost. This is because the congruence class is only blocked for a short amount of time to allow the particular set to be marked with a marked bit.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system, for enabling concurrent cache line replacement operations to a plurality of cache line sets of a congruence class, the computer system comprising:
a cache controller; and
a cache operatively connected to the cache controller, the cache comprising congruence classes where each of the congruence classes has its own addressable index;
wherein the congruence classes are rows in the cache;
wherein sets are columns in the cache, such that each of the sets is included in each of the congruence classes;
a cache directory having status indications for each memory element in the cache, the computer system configured to perform a method comprising:
when there is a cache miss to a given congruence class having given addressable index in the cache, placing a lock on the given congruence class to prevent access to the given congruence class as a whole while at least one set in the given congruence class is in a process of being marked by adding a marked bit in a status indication for the at least one set in the cache directory;
wherein the at least one set and other sets are in the given congruence class having the given addressable index, such that the at least one set and the other sets are on a same row defined by the given congruence class;
marking, by the cache controller, the at least one set of given the congruence class as a marked set by adding the marked bit into the status indication for the at least one set, the marked bit indicating that the marked set is unavailable while replacement operations are being performed on the marked set;
removing the lock on the given congruence class as a whole once the at least one set has been marked with the marked bit, such that the marked bit blocks access only to the marked set in the given congruence class while allowing access to the other sets in the given congruence class on the same row having the given addressable index;
selecting, by the cache controller, the other sets of the given congruence class without marked bits in their status indications in order to permit new replacement operations to be performed on the unmarked sets while the marked bit still blocks access only to the marked set in the given the congruence class on the same row having the given addressable index;
wherein the at least one set is unmarked based on the replacement operations being complete for the at least one set.

2. The computer system of claim 1, wherein the method further comprises evicting old data out of the at least one set and installing new data in the at least one set to complete the replacement operations on the at least one set.

3. The computer system of 1, wherein removing the lock permits unmarked sets to be selected for the new replacement operations while the marked bit blocks access only to the marked set in the given the congruence class on the same row having the given addressable index.

4. The computer system of claim 3, wherein the method further comprises placing another lock on the congruence class while selecting the unmarked sets without blocking the replacement operations being performed on the sets.

5. The computer system of claim 4, wherein the method further comprises marking the unmarked sets to set marked bits indicating that the unmarked sets are unavailable; and
removing the another lock once the marked bits are marked for the unmarked sets.

6. The computer system of claim 1, wherein the method further comprises allowing N−1 sets in the congruence class to be respectively marked with the marked bits;
wherein N is a total number of possible sets in the congruence class.

7. The computer system of claim 6, wherein the method further comprises locking the congruence class from further access based on the N−1 sets in the congruence class being respectively marked with the marked bits; and
blocking the congruence class from further marking any sets based on the N−1 sets in the congruence class being respectively marked with the marked bits.

8. A computer program product for enabling concurrent cache line replacement operations to a plurality of cache line sets of a congruence class, the computer program product comprising:
a non-transitory tangible storage medium readable by a cache controller, wherein a cache is operatively connected to the cache controller, the cache comprising congruence classes where each of the congruence classes has its own addressable index;
wherein a cache directory has status indications for each memory element in the cache;
wherein the congruence classes are rows in the cache;
wherein sets are columns in the cache, such that each of the sets is included in each of the congruence classes;
the non-transitory tangible storage medium storing instructions for execution by the cache controller for performing a method comprising:
when there is a cache miss to a given congruence class having a given addressable index in the cache, placing a lock on the given congruence class to prevent access to the given congruence class as a whole while at least one set in the given congruence class is in a process of being marked by adding a marked bit in a status indication for the at least one set in the cache directory;
wherein the at least one set and other sets are in the given congruence class having the given addressable index, such that the at least one set and the other sets are on a same row defined by the given congruence class;
marking, by the cache controller, the at least one set of the given congruence class as a marked set by adding the marked bit into the status indication for the at least one set, the marked bit indicating that the marked set is unavailable while replacement operations are being performed on the marked set;
removing the lock on the given congruence class as a whole once the at least one set has been marked with the marked bit, such that the marked bit blocks access only to the marked set in the given congruence class while allowing access to the other sets in the given congruence class;
selecting, by the cache controller, the other sets of the given congruence class without marked bits in their status indications in order to permit new replacement operations to be performed on the unmarked sets while the marked bit still blocks access only to the marked set in the given the congruence class on the same row having the given addressable index;

wherein the at least one set is unmarked based on the replacement operations being complete for the at least one set.

9. The computer program product of claim 8, further comprising evicting old data out of the at least one set and installing new data in the at least one set to complete the replacement operations on the at least one set.

10. The computer program product of claim 8, wherein removing the lock permits the unmarked sets to be selected for the new replacement operations.

11. The computer program product of claim 10, further comprising placing another lock on the congruence class while selecting the unmarked sets without blocking the replacement operations being performed on the at least one set.

* * * * *